United States Patent
Zhu

(10) Patent No.: US 12,446,023 B2
(45) Date of Patent: Oct. 14, 2025

(54) METHOD AND APPARATUS FOR SWITCHING SCHEDULING MODE

(71) Applicant: Beijing Xiaomi Mobile Software Co., Ltd., Beijing (CN)

(72) Inventor: Yajun Zhu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 338 days.

(21) Appl. No.: 18/332,293

(22) Filed: Jun. 9, 2023

(65) Prior Publication Data

US 2023/0354295 A1    Nov. 2, 2023

Related U.S. Application Data

(63) Continuation of application No. PCT/CN2020/135940, filed on Dec. 11, 2020.

(51) Int. Cl.
*H04W 72/12* (2023.01)
*H04W 72/232* (2023.01)

(52) U.S. Cl.
CPC ......... *H04W 72/12* (2013.01); *H04W 72/232* (2023.01)

(58) Field of Classification Search
CPC ...................................................... H04W 72/12
USPC .......................................................... 370/329
See application file for complete search history.

(56) References Cited

U.S. PATENT DOCUMENTS

2020/0053755 A1    2/2020    Ang et al.

FOREIGN PATENT DOCUMENTS

| | | |
|---|---|---|
| CN | 102083229 A | 6/2011 |
| CN | 102201885 A | 9/2011 |
| CN | 105578608 A | 5/2016 |
| CN | 107734706 A | 2/2018 |
| CN | 107852265 A | 3/2018 |
| CN | 109728890 A | 5/2019 |
| CN | 109788563 A | 5/2019 |
| CN | 110677887 A | 1/2020 |
| CN | 111132359 A | 5/2020 |
| CN | 111836390 A | 10/2020 |
| CN | 111865541 A | 10/2020 |
| WO | 2020033893 A1 | 2/2020 |

OTHER PUBLICATIONS

State Intellectual Property Office of the People's Republic of China, Office Action and Search Report Issued in Application No. 2020800039429, Dec. 20, 2024, 18 pages.
ISA State Intellectual Property Office of the People's Republic of China, Written Opinion of the International Searching Authority Issued in Application No. PCT/CN2020/135940, Jul. 19, 2021, WIPO, 6 pages.
ISA State Intellectual Property Office of the People's Republic of China, International Search Report Issued in Application No. PCT/CN2020/135940, Jul. 19, 2021, WIPO, 4 pages.
ASUSTeK, "Open Issues on SCell fast activation and deactivation", 3GPP TSG RAN WG1 #97, Reno, USA, R1-1906879, May 17, 2019, 3 pages.
State Intellectual Property Office of the People's Republic of China, Office Action and Search Report Issued in Application No. 2020800039429, May 15, 2025, 12 pages.

*Primary Examiner* — Angel T Brockman
(74) *Attorney, Agent, or Firm* — Volpe Koenig

(57) ABSTRACT

Switching scheduling mode methods and apparatuses are provided, which relate to the field of mobile communication technologies. The solution is: switching a scheduling mode based on acquired first DCI, where the first DCI includes an indication of a target scheduling mode adopted by a terminal.

20 Claims, 5 Drawing Sheets

Switch a scheduling mode based on acquired first DCI, where the first DCI includes an indication of a target scheduling mode adopted by a terminal — 101

FIG. 1

In response to the target scheduling mode indicated in the acquired first DCI being different from a current scheduling mode, switch the scheduling mode; or, in response to the target scheduling mode indicated in the acquired first DCI being the same as a current scheduling mode, maintain the current scheduling mode — 201

FIG. 2

Acquire the first DCI based on a target RNTI corresponding to the terminal — 301

Determine the target scheduling mode of the terminal according to a current value of a target bit corresponding to the terminal in the first DCI — 302

In response to the target scheduling mode indicated in the acquired first DCI being different from a current scheduling mode, switch the scheduling mode; or, in response to the target scheduling mode indicated in the acquired first DCI being the same as a current scheduling mode, maintain the current scheduling mode — 303

FIG. 3

Send first DCI, where the first DCI includes an indication of a target scheduling mode adopted by a terminal — 601

FIG. 6

Send the first DCI in a CSS of a primary cell/primary secondary cell; or, send the first DCI in a CSS of a secondary cell; or, send the first DCI in a USS of a secondary cell — 701

FIG. 7

In response to determining that a scheduling mode of any terminal is to be switched, the first DCI is determined to be sent, and a current value of a target bit corresponding to the any terminal in the first DCI is set — 801

Scramble a CRC code in the first DCI based on a target RNTI corresponding to any terminal — 802

Send the first DCI, where the first DCI includes an indication of a target scheduling mode adopted by the any terminal — 803

FIG. 8

In response to determining that a scheduling mode of any terminal is to be switched, the first DCI is determined to be sent, and a value of a designated information field in the first DCI is set to a first designated value — 1001

Send the first DCI, where the first DCI includes an indication of a target scheduling mode of the any terminal — 1002

FIG. 9

METHOD AND APPARATUS FOR SWITCHING SCHEDULING MODE

CROSS-REFERENCE TO RELATED APPLICATION

The present application is a continuation application of International Application No. PCT/CN2020/135940 filed on Dec. 11, 2020, which is incorporated herein by reference in its entirety.

TECHNICAL FIELD

The present disclosure relates to the field of mobile communication technologies, and in particular, to methods and apparatuses for switching a scheduling mode.

BACKGROUND

The cellular mobile communication technology is in an evolution stage of a next-generation technology. An important feature of the next-generation technology is to support flexible configuration of multiple service types. Initial deployment of the next-generation mobile communication technology usually occurs in areas with high traffic density and high requirements for new services, and then gradually expands coverage of new technology. In a process of gradually deploying new access technologies, mixed coverage of new technologies and old technologies has become a demand of operator networks. Usually, in areas where a new technology has been deployed, it is necessary to keep earlier technologies, and new technologies and old technologies coexist for a long time to ensure continuous services for old devices that do not support the new technology.

The new technology can be deployed in a same spectrum as the old technology, so that a total spectrum capacity can be dynamically shared between two technologies to improve spectrum utilization.

SUMMARY

Embodiments of a first aspect of the present disclosure provide a method of switching a scheduling mode, which is applied to a terminal, including:
  switching a scheduling mode based on acquired first downlink control information (DCI) where the first DCI includes an indication of a target scheduling mode adopted by a terminal.

Embodiments of a second aspect of the present disclosure provide a method of switching a scheduling mode, which is applied to a base station, including:
  sending first DCI, where the first DCI includes an indication of a target scheduling mode adopted by one or more terminals.

Embodiments of a third aspect of the present disclosure provide an apparatus for switching a scheduling mode, which is applied to a terminal, including:
  a processing module, configured to switch a scheduling mode based on acquired first DCI, where the first DCI includes an indication of a target scheduling mode adopted by a terminal.

Embodiments of a fourth aspect of the present disclosure provide an apparatus for switching a scheduling mode, which is applied to a base station, including:
  a sending module, configured to send first DCI, where the first DCI includes an indication of a target scheduling mode adopted by a terminal.

Embodiments of a fifth aspect of the present disclosure provide a communication device, including: a transceiver, a memory and a processor, connected to the transceiver and the memory, respectively, and configured to control radio signal transmission and reception of the transceiver by executing computer-executable instructions on the memory, and implement the methods described in the embodiments of the first aspects or the second aspects mentioned above.

Embodiments of a sixth aspect of the present disclosure provide a computer storage medium, where the computer storage medium stores computer executable instructions; when the computer executable instructions are executed by a processor, the methods described in the embodiments of the first aspects or the second aspects mentioned above are implemented.

Additional aspects and advantages of the present disclosure will be given in part in the following description, and some will become apparent from the following description, or will be learned through the practice of the present disclosure.

BRIEF DESCRIPTION OF DRAWINGS

The above-mentioned and/or additional aspects and advantages of the present disclosure will be apparent and easily understood from the following description of embodiments taken in conjunction with accompanying drawings, in which:

FIG. 1 is a flowchart of a method for switching a scheduling mode according to an embodiment of the present disclosure;

FIG. 2 is a flowchart of another method for switching a scheduling mode according to an embodiment of the present disclosure;

FIG. 3 is a flowchart of another method for switching a scheduling mode according to an embodiment of the present disclosure;

FIG. 6 is a flowchart of another method for switching a scheduling mode according to an embodiment of the present disclosure;

FIG. 7 is a flowchart of another method for switching a scheduling mode according to an embodiment of the present disclosure;

FIG. 8 is a flowchart of another method for switching a scheduling mode according to an embodiment of the present disclosure;

FIG. 9 is a flowchart of another method for switching a scheduling mode according to an embodiment of the present disclosure;

DETAILED DESCRIPTION

Figure 4:
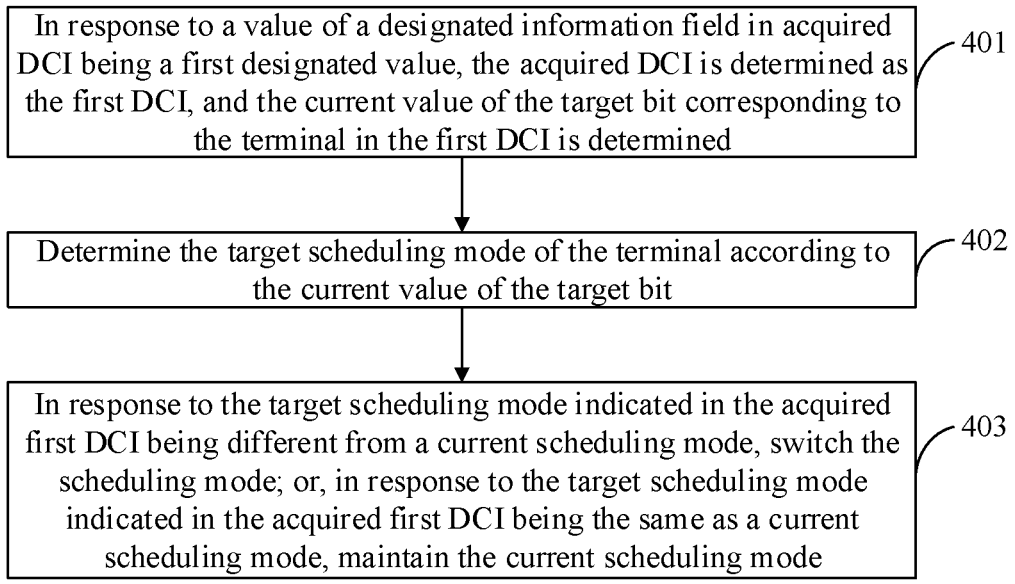
FIG. 4 is a flowchart of another method for switching a scheduling mode according to an embodiment of the present disclosure.

Hereinafter, embodiments of the present disclosure will be described in detail, examples of which are illustrated in the accompanying drawings, where the same or similar reference numerals from beginning to end indicate the same or similar components or components having the same or similar functions throughout. Embodiments described below by referring to the accompanying drawings are exemplary and are intended to explain the present disclosure, and should not be construed as limiting the present disclosure.

In existing 5G systems and standards, Radio Resource Control (RRC) signaling configures carriers for self-scheduling or cross-carrier scheduling. Self-scheduling, i.e., DCI is received on a current carrier and a Physical Downlink Shared Channel (PDSCH) or a Physical Uplink Shared Channel (PUSCH) is scheduled on the current carrier. Cross-carrier scheduling, i.e., DCI is received on one carrier while PDSCH or PUSCH is scheduled on another carrier. When RRC signaling configures a carrier (referred to as carrier C) as being scheduled (corresponding to a scheduled cell), RRC signaling configures a scheduling carrier index for scheduling the carrier C (i.e., which carrier schedules carrier C, and a carrier for scheduling the carrier C can be referred to as a scheduling carrier, corresponding to a scheduling cell) and configure a carrier indicator field (CIF) value of carrier C in the scheduling carrier. A carrier indicator (CI) in DCI on a scheduling carrier, also known as CIF, may indicate a CIF value of carrier C configured in RRC signaling. Specifically, in the CI of the DCI, it indicates to configure a CIF value of carrier C in the scheduling carrier in cif-InSchedulingCell of CrossCarrierSchedulingConfig cell of the RRC signaling. And configure an index of the scheduling cell in schedulingCellId of the CrossCarrierSchedulingConfig cell. Assuming that RRC signaling configures the carrier C to be cross-carrier scheduling by carrier A and configures the CIF value of the carrier C in the scheduling carrier A to be 1, when a CI value indicated by a CIF of DCI on the carrier A is 1, then this DCI means scheduling a PDSCH or a PUSCH of carrier C.

It should be noted that, the CIF cannot be configured in DCI format 1_0 or DCI format 0_0 (which are also referred to as fallback DCI), thus DCI format 1_0 and DCI format 0_0 can only be used for self-scheduling but not for cross-carrier scheduling. The CIF can be configured in DCI format 0_1, DCI format 0_2, DCI format 1_1, and DCI format 1_2 (which are also referred to as non-fallback DCI), which means these DCI formats can be used for cross-carrier scheduling.

When RRC configures a carrier as self-scheduling, DCI format 1_0 can only be used to schedule a PDSCH on this carrier, DCI format 0_0 can only be used to schedule a PUSCH on the carrier, DCI format 1_1 with CIF=0 and DCI format 1_2 with CIF=0 may be used to schedule a PDSCH on this carrier, and DCI format 0_1 with CIF=0 and DCI format 0_2 with CIF=0 may be used to schedule a PUSCH on this carrier. When RRC configures a carrier (such as carrier C) as being scheduled, and a CIF of DCI (DCI format 0_1, DCI format 0_2, DCI format 1_1 and DCI format 1_2) on a scheduling carrier (such as carrier A) is a CIF value which is configured for the carrier C in the scheduling carrier A, it means that the carrier A cross-carrier schedules carrier C, and one CIF value can only correspond to one carrier. One carrier can only be configured as self-scheduling or cross-carrier scheduling at one time, and cannot be configured as self-scheduling and cross-carrier scheduling at the same time.

In related art, for a case that a new technology and an old technology are deployed in a same spectrum, a switching between self-scheduling and cross-carrier scheduling in the new technology is indicated by high-level signaling, such as RRC signaling, and switching speed is relatively slow.

Aiming at this problem, embodiments of the present disclosure provide methods and apparatuses for switching a scheduling mode.

FIG. 1 is a flowchart of a method for switching a scheduling mode according to an embodiment of the present disclosure. The method is executed by a terminal, by switching a scheduling mode based on DCI, fast switching between self-scheduling and cross-carrier scheduling can be achieved, which can better adapt to changes in link quality and load, and improve utilization of system resources.

As shown in FIG. 1, the method for switching the scheduling mode includes the following steps:

at step 101, a scheduling mode is switched based on acquired first DCI, where the first DCI includes an indication of a target scheduling mode adopted by a terminal.

In the present disclosure, the terminal can acquire DCI sent by a base station. Information of the DCI may be used to indicate a target scheduling mode of the terminal. For ease of distinction, this DCI can be referred to as first DCI.

The scheduling mode can refer to whether a downlink control channel and a data channel are on a same carrier or on different carriers. Scheduling modes can include self-scheduling and cross-carrier scheduling. Self-scheduling may mean that the downlink control channel and data channel are on the same carrier, and cross-carrier scheduling may mean that the downlink control channel and data channel are on different carriers.

Based on the acquired first DCI, the terminal switches the scheduling mode according to the first DCI. For example, if the first DCI indicates that the target scheduling mode of the terminal is self-scheduling, the terminal can switch from a current scheduling mode to a self-scheduling mode.

In the method for switching the scheduling mode in the embodiment of the present disclosure, the scheduling mode is switched according to the target scheduling mode indicated by DCI, so that fast switching between self-scheduling and cross-carrier scheduling is achieved, which can better adapt to changes in link quality and load, and improve utilization of system resources.

FIG. 2 is a flowchart of another method for switching a scheduling mode according to an embodiment of the present disclosure. The method is executed by a terminal, and the scheduling mode is switched by judging whether a scheduling mode indicated by first DCI is different from a current scheduling mode.

As shown in FIG. 2, the method for switching the scheduling mode includes:

at step 201, in response to the target scheduling mode indicated in the acquired first DCI being different from a current scheduling mode, the scheduling mode is switched; or, in response to the target scheduling mode indicated in the acquired first DCI being the same as a current scheduling mode, the current scheduling mode is maintained.

In the present disclosure, the terminal may acquire first DCI sent by a base station, where the first DCI includes a target scheduling mode of the terminal, and the first DCI may include a target scheduling mode of at least one terminal. The scheduling modes may include self-scheduling and cross-carrier scheduling.

In some examples, the terminal may acquire the first DCI in the common search space (CSS) or acquire the first DCI in the UE-specific search space (USS).

In some examples, a length of the first DCI may be different from that of any other existing DCI.

Since the number of blind detections of the terminal is related to the length of the DCI, in order not to increase the number of blind detections of the terminal, in some examples, the length of the first DCI may be the same as a length of fallback DCI. Since the length of the first DCI is the same as that of the fallback DCI, the number of blind detections of the terminal will not be increased.

The terminal may compare the target scheduling mode indicated by the first DCI with the current scheduling mode, and the terminal will switch the current scheduling mode to the target scheduling mode in response to the target scheduling mode being different from the current scheduling mode, so as to achieve the switching of the scheduling mode.

Or, the terminal continues to maintain the current scheduling mode in response to the target scheduling mode indicated in the first DCI being the same as the current scheduling mode.

For example, if the target scheduling mode indicated in the first DCI is cross-carrier scheduling, and the current scheduling mode of the terminal is self-scheduling, the terminal switches from self-scheduling to cross-carrier scheduling. If the current scheduling mode of the terminal is cross-carrier scheduling, the terminal continues to maintain cross-carrier scheduling.

For another example, if the target scheduling mode indicated in the first DCI is self-scheduling, and the current scheduling mode of the terminal is cross-carrier scheduling, the terminal switches from cross-carrier scheduling to self-scheduling. If the current scheduling mode of the terminal is self-scheduling, then the terminal continues to maintain self-scheduling.

In the method for switching the scheduling mode in the embodiment of the present disclosure, whether to switch the scheduling mode is determined by judging whether the scheduling mode indicated by DCI is different from the current scheduling mode, so that fast switching between self-scheduling and cross-carrier scheduling is achieved, which can better adapt to changes in link quality and load, and improve utilization of system resources.

FIG. 3 is a flowchart of another method for switching a scheduling mode according to an embodiment of the present disclosure. The method is executed by a terminal. In response to a radio network temporary identifier (RNTI) associated with the acquired DCI is an RNTI of a group to which the terminal belongs, determining that first DCI is acquired, the target scheduling mode is determined based on a current value of a target bit corresponding to the terminal in the first DCI, and whether to switch the scheduling mode is determined according to the target scheduling mode and the current scheduling mode.

As shown in FIG. 3, the method for switching the scheduling mode includes the following.

At step 301, the first DCI is acquired based on a target RNTI corresponding to the terminal.

In the present disclosure, the terminal may acquire a terminal grouping indication message sent by a base station, and determine a target RNTI corresponding to a group to which the terminal belongs by parsing the acquired terminal grouping indication message. The terminal grouping indication message acquired by the terminal may only indicate the target RNTI of the group in which the terminal belongs, or may include the RNTI of a plurality of terminal groups, and the terminal may determine its corresponding target RNTI according to a mapping relationship between a terminal identifier and the RNTI.

The base station may scramble a Cyclic Redundancy Check (CRC) code attached to the first DCI with an RNTI, and send the first DCI attach with the scrambled CRC code to the terminal. According to the terminal's corresponding target RNTI, the terminal may perform the blind detection on the downlink transmission containing DCI on a physical downlink control channel, so as to obtain DCI corresponding to the terminal, that is, the first DCI. For example, the terminal uses a target RNTI associated with itself to descramble the scrambled CRC code in the downlink transmission on the physical downlink control channel to obtain a descrambled CRC code, and uses this CRC code to check the blind-detected DCI. If the check is successful, the downlink transmission is received. And if the check fails, the downlink transmission is discarded.

In some examples, the terminal may acquire the first DCI in the CSS or acquire the first DCI in the USS.

In some examples, a length of the first DCI may be different from that of DCI that specified in any other protocol.

Since the number of blind detections of the terminal is related to the length of the DCI, in order not to increase the number of blind detections of the terminal, in some examples, the length of the first DCI may be the same as a length of fallback DCI. Since the length of the first DCI is the same as that of the fallback DCI, the number of blind detections of the terminal will not be increased.

At step 302, the target scheduling mode of the terminal is determined according to a current value of a target bit corresponding to the terminal in the first DCI.

In the present disclosure, the first DCI may include bits corresponding to one or more terminals respectively, and values of the bits may be used to indicate the target scheduling modes of the corresponding terminals. That is to say, the first DCI may include a target scheduling method of at least one terminal.

The target bit corresponding to each terminal in the first DCI can be pre-agreed, for example, it can be pre-specified by a standard, or it may be determined by the terminal according to an instruction indicating its target bit sent by the base station. Then, the terminal may determine a position of a target bit in the first DCI that corresponds to it.

In the present disclosure, different values of the target bit corresponding to the terminal in the first DCI can indicate different scheduling modes. Then, the terminal can determine the target scheduling mode of the terminal according to the current value of the target bit.

For example, a value of 0 indicates self-scheduling and a value of 1 indicates cross-carrier scheduling. If a current value of a target bit corresponding to a terminal in the first DCI is 1, it can be determined that the target scheduling mode of the terminal is cross-carrier scheduling.

It should be noted that a value of the bit is 0 or 1 and its corresponding scheduling mode are only examples, and can be set according to actual needs, which is not limited in the embodiments.

In one embodiment, the value of the bit can only indicate whether the corresponding terminal should switch the scheduling mode. For example, the value of the bit is 0 may indicate that a current scheduling mode is maintained. And the value of the bit is 1 may indicate switching a scheduling mode.

In one embodiment, the target bits can be a plurality of bits to indicate a specific number of scheduling modes. For example, the target bit includes 2 bits, 00 indicates a first scheduling mode, 01 indicates a second scheduling mode, 10 indicates a third scheduling mode, 11 indicates a fourth scheduling mode, and so on.

At step 303, in response to the target scheduling mode indicated in the acquired first DCI being different from a current scheduling mode, the scheduling mode is switched; or, in response to the target scheduling mode indicated in the acquired first DCI being the same as a current scheduling mode, the current scheduling mode is maintained.

In the present disclosure, step 303 can be implemented in any one of the embodiments of the present disclosure, and embodiments of the present disclosure do not limit this and will not be repeated here.

In the method for switching the scheduling mode in the embodiment of the present disclosure, the first DCI is acquired based on a target RNTI corresponding to the terminal, the target scheduling mode of the terminal is determined according to a current value of a target bit corresponding to the terminal in the first DCI, and whether to switch the scheduling mode is determined according to the target scheduling mode and the current scheduling mode, so that fast switching between self-scheduling and cross-carrier scheduling is achieved, which can better adapt to changes in link quality and load, and improve utilization of system resources.

FIG. 4 is a flowchart of another method for switching a scheduling mode according to an embodiment of the present disclosure. The method is executed by a terminal, in response to a value of a designated information field in acquired DCI being a first designated value, the acquired DCI is determined as the first DCI. The target scheduling mode is determined based on a current value of a target bit corresponding to the terminal in the first DCI, and whether to switch the scheduling mode is determined according to the target scheduling mode and the current scheduling mode.

As shown in FIG. 4, the method for switching the scheduling mode includes the following.

At step 401, in response to a value of a designated information field in acquired DCI being a first designated value, the acquired DCI is determined as the first DCI, and the current value of the target bit corresponding to the terminal in the first DCI is determined.

In an embodiment, a designated information field in the first DCI may be pre-agreed, such as a standard pre-specified, and is not limited in the present disclosure.

Since a length of the first DCI may be the same as that of other DCI, in order to distinguish the first DCI from other DCI, in the present disclosure, the value of the designated information field in the first DCI can be a designated value, which is called the first designated value here for the convenience of distinction. The first designated value can be set as required.

In the present disclosure, the first DCI may include bits corresponding to one or more terminals respectively, and values of the bits may be used to indicate the target scheduling mode of the corresponding terminals. The terminal can determine the current value of the target bit corresponding to the terminal in the first DCI in response to acquiring the first DCI.

At step 402, the target scheduling mode of the terminal according to the current value of the target bit is determined.

In the present disclosure, step 402 can be implemented in any one of the embodiments of the present disclosure, and embodiments of the present disclosure do not limit this and will not be repeated here.

In some examples, the first DCI may also include other information, such as other indication information from the base station to the terminal, etc. The embodiment of the present disclosure does not limit other information.

At step 403, in response to the target scheduling mode indicated in the acquired first DCI being different from a current scheduling mode, the scheduling mode is switched; or, in response to the target scheduling mode indicated in the acquired first DCI being the same as a current scheduling mode, the current scheduling mode is maintained.

In the present disclosure, step 403 can be implemented in any one of the embodiments of the present disclosure, and embodiments of the present disclosure do not limit this and will not be repeated here.

In the method for switching the scheduling mode in the embodiment of the present disclosure, in response to a value of a designated information field in acquired DCI being a first designated value, the acquired DCI is determined as the first DCI and the target scheduling mode is determined based on a current value of a target bit corresponding to the terminal in the first DCI, and whether to switch the scheduling mode is determined according to the target scheduling mode and the current scheduling mode, so that fast switching between self-scheduling and cross-carrier scheduling is achieved, which can better adapt to changes in link quality and load, and improve utilization of system resources.

Figure 5:
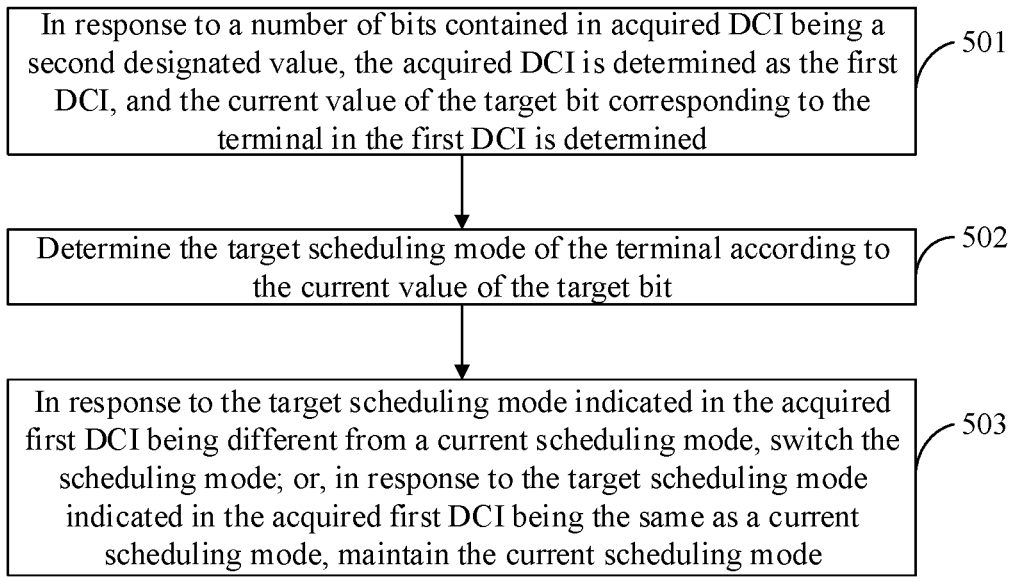
FIG. 5 is a flowchart of another method for switching a scheduling mode according to an embodiment of the present disclosure.

FIG. 5 is a flowchart of another method for switching a scheduling mode according to an embodiment of the present disclosure. The method is executed by a terminal, in response to a number of bits contained in DCI being a second designated value, the acquired DCI is determined as the first DCI, the target scheduling mode is determined based on a current value of a target bit corresponding to the terminal in the first DCI, and whether to switch the scheduling mode is determined according to the target scheduling mode and the current scheduling mode.

As shown in FIG. 5, the method for switching the scheduling mode includes the following.

At step 501, in response to a number of bits contained in acquired DCI being a second designated value, the acquired DCI is determined as the first DCI, and the current value of the target bit corresponding to the terminal in the first DCI is determined.

In order to distinguish the first DCI from other DCI, in the present disclosure, the number of bits contained in the first DCI may be the second designated value. The second designated value is different from the number of bits contained in other DCI, and the second designated value can be set as required. The second designated value may be pre-agreed, such as a standard pre-specified, and is not limited in the present disclosure.

In the present disclosure, the first DCI may include bits corresponding to one or more terminals respectively, and values of the bits may be used to indicate the target scheduling mode of the corresponding terminal(s). The terminal can determine the current value of the target bit corresponding to the terminal in the first DCI in response to acquiring the first DCI.

At step 502, the target scheduling mode of the terminal according to the current value of the target bit is determined.

In the present disclosure, step 502 can be implemented in any one of the embodiments of the present disclosure, and embodiments of the present disclosure do not limit this and will not be repeated here.

In some examples, the first DCI may also include other information, such as other indication information from the base station to the terminal, etc. The embodiment of the present disclosure does not limit other information.

At step 503, in response to the target scheduling mode indicated in the acquired first DCI being different from a current scheduling mode, the scheduling mode is switched; or, in response to the target scheduling mode indicated in the acquired first DCI being the same as a current scheduling mode, the current scheduling mode is maintained.

In the present disclosure, step 503 can be implemented in any one of the embodiments of the present disclosure, and embodiments of the present disclosure do not limit this and will not be repeated here.

In the method for switching the scheduling mode in the embodiment of the present disclosure, in response to a number of bits contained in DCI being a second designated value, the acquired DCI is determined as the first DCI, the target scheduling mode is determined based on a current value of a target bit corresponding to the terminal in the first DCI, and whether to switch the scheduling mode is determined according to the target scheduling mode and the current scheduling mode, so that fast switching between self-scheduling and cross-carrier scheduling is achieved, which can better adapt to changes in link quality and load, and improve utilization of system resources.

FIG. 6 is a flowchart of another method for switching a scheduling mode according to an embodiment of the present disclosure. The method can be executed by a base station, and a target scheduling mode of a terminal is indicated by DCI, so that the terminal can quickly switch between self-scheduling and cross-carrier scheduling, which can better adapt to changes in link quality and load, and improve utilization of system resources.

As shown in FIG. 6, the method for switching the scheduling mode includes the following.

At step 601, first DCI is sent, where the first DCI includes an indication of a target scheduling mode adopted by a terminal.

In the present disclosure, the base station may use the DCI to indicate the target scheduling mode of the terminal, which is referred to as the first DCI here for the convenience of distinction, and the base station may send the first DCI to the terminal, so that the terminal can switch the scheduling mode according to the acquired first DCI.

Scheduling modes can include self-scheduling and cross-carrier scheduling. Self-scheduling may mean that the downlink control channel and data channel are on the same carrier, and cross-carrier scheduling may mean that the downlink control channel and data channel are on different carriers.

In some examples, the first DCI may include a target scheduling mode of one or more terminals, then the base station may send the first DCI to each terminal.

In some examples, the base station may send the first DCI to the terminal in response to a deterioration of link quality of a secondary cell scheduling a primary cell/primary secondary cell, or sufficient Physical Downlink Control Channel (PDCCH) resources of the primary cell/primary secondary cell.

According to the method for switching the scheduling mode in the embodiment of the present disclosure, a target scheduling mode of a terminal is indicated by DCI, so that the terminal can quickly switch between self-scheduling and cross-carrier scheduling, which can better adapt to changes in link quality and load, and improve utilization of system resources.

FIG. 7 is a flowchart of another method for switching a scheduling mode according to an embodiment of the present disclosure. The method can be performed by a base station, the first DCI is sent in CSS or USS.

As shown in FIG. 7, the method for switching the scheduling mode includes the following.

At step 701, the first DCI is sent in a CSS of a primary cell/primary secondary cell; or, the first DCI is sent in a CSS of a secondary cell; or, the first DCI is sent in a USS of a secondary cell.

In the present disclosure, the base station may send the first DCI to the terminal within the CSS of the primary cell/primary secondary cell. Or, the base station may send the first DCI to the terminal within the CSS of the secondary cell, so as to send the first DCI using a secondary frequency band. Or, the first DCI is sent in the USS of the secondary cell. The first DCI is used to indicate a target scheduling mode of the terminal. The scheduling mode includes self-scheduling or cross-carrier scheduling.

In some examples, a length of the first DCI may be different from that of any other DCI.

Since the number of blind detections of the terminal is related to the length of the DCI, in order not to increase the number of blind detections of the terminal, in some examples, the length of the first DCI may be the same as a length of fallback DCI. Since the length of the first DCI is the same as that of the fallback DCI, the number of blind detections of the terminal will not be increased.

In some examples, the first DCI may include a target scheduling mode of at least one terminal, and the base station may send the first DCI to each terminal respectively, so that each terminal can switch the scheduling mode according to its target scheduling mode indicated by the first DCI. Therefore, the base station may use the first DCI to indicate the target scheduling mode of one or more terminals.

According to the method for switching the scheduling mode in the embodiment of the present disclosure, the first DCI is sent in a CSS of a primary cell/primary secondary cell; or, the first DCI is sent in a CSS of a secondary cell; or, the first DCI is sent in a USS of a secondary cell. By sending DCI indicating the terminal's target scheduling mode to the terminal, the terminal can quickly switch between self-scheduling and cross-carrier scheduling, which can better adapt to changes in link quality and load, and improve utilization of system resources.

FIG. 8 is a flowchart of another method for switching a scheduling mode according to an embodiment of the present disclosure. The method can be executed by a base station, and an RNTI in first DCI is determined according to a target RNTI corresponding to any terminal in response to determining the scheduling mode of any terminal.

As shown in FIG. 8, the method for switching the scheduling mode includes the following.

At step 801: in response to determining that a scheduling mode of any terminal is to be switched, the first DCI is determined to be sent, and a current value of a target bit corresponding to the any terminal in the first DCI is set.

In the present disclosure, the base station can determine the scheduling mode of any terminal according to current link quality or load condition. For example, if current link quality of a secondary cell scheduling a primary cell/primary secondary cell deteriorates, or a primary cell/primary secondary cell has sufficient PDCCH resources, the base station can determine that the scheduling mode of a primary cell/primary secondary of a terminal should be switched to self-scheduling.

The first DCI may include bits corresponding to one or more terminals respectively, and the base station may determine a position of a target bit corresponding to any terminal in the first DCI according to pre-agreed target bits corresponding to each terminal in the first DCI, and determine the current value of the target bit corresponding to any terminal in the first DCI according to the determined scheduling mode of any terminal. The current value of the target bit corresponding to any terminal in the first DCI is used to indicate the target scheduling method of any terminal.

For example, a value of 0 indicates self-scheduling, and a value of 1 indicates cross-carrier scheduling. If the base station determines that the scheduling mode of a terminal is cross-carrier, then the base station determines that the current value of the target bit corresponding to the terminal in the first DCI is 1.

It should be noted that a value of the bit is 0 or 1 and its corresponding scheduling mode are only examples, and can be set according to actual needs, which is not limited in these embodiments.

In one embodiment, the value of the bit can only indicate whether the corresponding terminal should switch the scheduling mode. For example, the value of the bit is 0 may indicate that a current scheduling mode is maintained. And the value of the bit is 1 may indicate switching a scheduling mode.

In one embodiment, the target bits can be a plurality of bits to indicate a specific number of scheduling modes. For example, the target bit includes 2 bits, 00 indicates a first scheduling mode, 01 indicates a second scheduling mode, 10 indicates a third scheduling mode, 11 indicates a fourth scheduling mode, and so on.

At step 802, a CRC code in the first DCI is scrambled based on a target RNTI corresponding to any terminal.

In the present disclosure, each terminal can correspond to one RNTI, and the base station can scramble a CRC code attached to the first DCI with an RNTI corresponding to any terminal.

In some examples, the base station can also group the terminals according to their types or other information. Each group corresponds to a RNTI, RNTI can be used to indicate an identifier of a group where the terminal belongs, and terminals in the same group correspond to an RNTI. If there are a plurality of terminals in the group, then the plurality of terminals correspond to an RNTI. The base station can scramble a CRC code attached to the first DCI with a target RNTI corresponding to the any terminal in the group.

It should be noted that the number of terminals included in each group can be one or multiple, and the number of terminals included in each group can be determined according to the implementation needs.

At step 803, the first DCI is sent, where the first DCI includes an indication of a target scheduling mode adopted by the any terminal.

In the present disclosure, the base station can send the first DCI attach with the scrambled CRC code to the terminal. The terminal may perform blind detection on downlink transmission containing DCI on a physical downlink control channel, so as to obtain DCI corresponding to the terminal according to the terminal's corresponding target RNTI, that is, the first DCI. For example, the terminal uses a target RNTI associated with itself to descramble the scrambled CRC code in the downlink transmission on the physical downlink control channel to obtain a descrambled CRC code, and uses this CRC code to check the blind-detected DCI. If the check is successful, the downlink transmission is received. And if the check fails, the downlink transmission is discarded.

In the method for switching the scheduling mode in the embodiment of the present disclosure, a current value of a target bit corresponding to any terminal in the first DCI is set in response to determining that a scheduling mode of any terminal needs to be changed, a CRC code in the first DCI is scrambled based on a target RNTI corresponding to any terminal, and the first DCI is sent, so that the terminal utilizes the target RNTI associated with itself to acquire the first DCI corresponding to the terminal, and switch the scheduling mode based on the target scheduling mode indicated by the first DCI, and the terminal quickly switches between self-scheduling and cross-carrier scheduling, which can better adapt to changes in link quality and load, and improve utilization of system resources.

FIG. 9 is a flowchart of another method for switching a scheduling mode according to an embodiment of the present disclosure. The method can be executed by a base station, in response to determining the scheduling mode of any terminal, a value of a designated information field in the first DCI as a first designated value is determined.

As shown in FIG. 9, the method for switching the scheduling mode includes the following.

At step 1001, in response to determining that a scheduling mode of any terminal is to be switched, the first DCI is determined to be sent, and a value of a designated information field in the first DCI is set to a first designated value.

In the present disclosure, the base station can determine whether the scheduling mode of any terminal should be changed according to current link quality or load condition. For example, if current link quality of a secondary cell scheduling a primary cell/primary secondary cell deteriorates, or a primary cell/primary secondary cell has sufficient PDCCH resources, the base station can determine that the scheduling mode of a primary cell/primary secondary of a terminal should be changed to self-scheduling.

In an embodiment, a designated information field in the first DCI may be pre-agreed, such as a standard pre-specified, and is not limited in the present disclosure.

Since a length of the first DCI is the same as that of other DCI, in order to distinguish the first DCI from other DCI, in the present disclosure, the value of the designated information field in the first DCI can be a designated value, which is called a first designated value here for the convenience of distinction. The first designated value can be set as required, which is not limited in these embodiments. The base station can determine the value of the designated information field in the first DCI as the first designated value according to the determined scheduling mode of any terminal.

At step 1002, the first DCI is sent, where the first DCI includes an indication of a target scheduling mode of the any terminal.

In the present disclosure, step 1002 can be implemented in any one of the embodiments of the present disclosure, and embodiments of the present disclosure do not limit this and will not be repeated here.

In the method for switching the scheduling mode in the embodiment of the present disclosure, a value of a designated information field in the first DCI is determined as a first designated value in response to determining that a scheduling mode of any terminal is to be switched, the use of DCI with designated information field values as a designated value to indicate the target scheduling mode of the terminal enriches the diversity of DCI formats.

Figure 10:
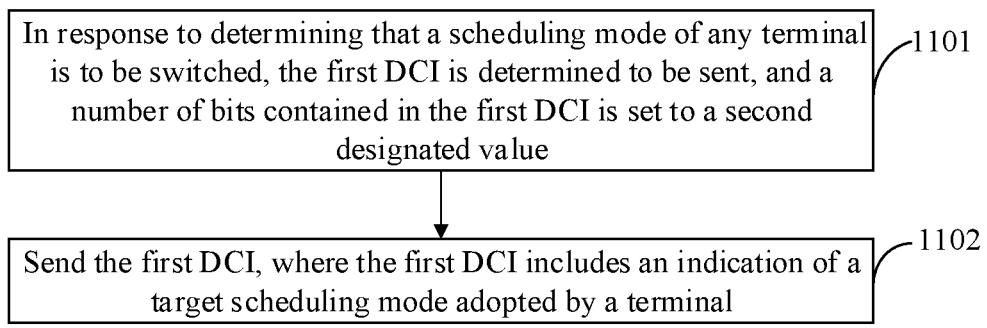
FIG. 10 is a flowchart of another method for switching a scheduling mode according to an embodiment of the present disclosure.

FIG. 10 is a flowchart of another method for switching a scheduling mode according to an embodiment of the present disclosure. The method can be executed by a base station, in response to determining the scheduling mode of any terminal, a number of bits contained in the first DCI is determined as a second designated value.

As shown in FIG. 10, the method for switching the scheduling mode includes the following.

At step 1101, in response to determining that a scheduling mode of any terminal is to be switched, the first DCI is determined to be sent, and a number of bits contained in the first DCI is set to a second designated value.

In the present disclosure, the base station can determine the scheduling mode of any terminal according to current link quality or load condition. For example, if current link quality of a secondary cell scheduling a primary cell/primary secondary cell deteriorates, or a primary cell/primary secondary cell has sufficient PDCCH resources, the base station can determine that the scheduling mode of a primary cell/primary secondary of a terminal should be switched to self-scheduling.

In order to distinguish the first DCI from other DCI, in the present disclosure, the number of bits contained in the first DCI may be a second designated value. The second designated value is different from the number of bits contained in other DCI, and the second designated value can be set as required. The base station may determine the first DCI to be transmitted in response to any terminal switching scheduling mode, and set the number of bits contained in the first DCI to the second designated value.

At step 1102, the first DCI is sent, where the first DCI includes an indication of a target scheduling mode adopted by a terminal.

In the present disclosure, step 1102 can be implemented in any one of the embodiments of the present disclosure, and embodiments of the present disclosure do not limit this and will not be repeated here.

In the method for switching the scheduling mode in the embodiment of the present disclosure, in response to determining that a scheduling mode of any terminal is to be switched, a number of bits contained in the first DCI to be sent is determined as a second designated value, the use of DCI with the contained number of bits as a designated value to indicate the target scheduling mode of the terminal enriches the diversity of DCI formats.

The following is a further explanation of the method for switching the scheduling mode, and method for switching the scheduling mode can be executed by a base station. In the present disclosure, the method for switching the scheduling mode can be realized in the following ways:

method 1: A group common DCI is used to indicate cross-carrier scheduling, and send DCI on a CSS of a primary cell/primary secondary cell or a secondary cell.

In some examples, terminals can be grouped, and the base station designates an RNTI for each terminal group.

In some examples, in order not to increase the number of blind detections of the terminal, a length of the DCI is consistent with that of fallback DCI on CSS.

In some examples, each terminal may correspond to one bit in DCI. For example, a value of a bit corresponding to a terminal is 0, indicating self-scheduling; a value of a bit corresponding to the terminal is 1, indicating cross-carrier scheduling.

In one embodiment, the value of the bit can only indicate whether the corresponding terminal should switch a scheduling mode. For example, the value of the bit is 0 may indicate that a current scheduling mode is maintained. And the value of the bit is 1 may indicate switching a scheduling mode.

In one embodiment, the target bits can also be a plurality of bits to indicate a specific number of scheduling modes. For example, the target bit includes 2 bits, 00 indicates a first scheduling mode, 01 indicates a second scheduling mode, 10 indicates a third scheduling mode, 11 indicates a fourth scheduling mode, and so on.

Method 2: A new DCI format is used for cross-carrier scheduling indication, and the DCI is sent on a CSS of a primary cell/primary secondary cell or a USS of a secondary cell. Design methods of DCI format is as follows:

Firstly, a new DCI format can be defined to ensure that the number of bits of the DCI (recorded as a second designated value) is different from that of the existing DCI format.

Secondly, a new DCI format can be defined to use a same number of bits as an existing DCI format, and set the new DCI information field to a designated value (recorded as a first designated value) to represent the new DCI format.

Figure 11:
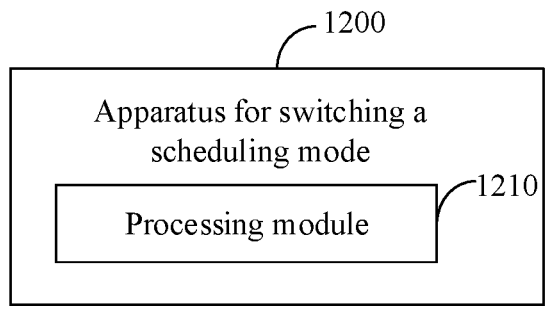
FIG. 11 is a schematic structural diagram of an apparatus for switching a scheduling mode according to an embodiment of the present disclosure.
Figure 12:
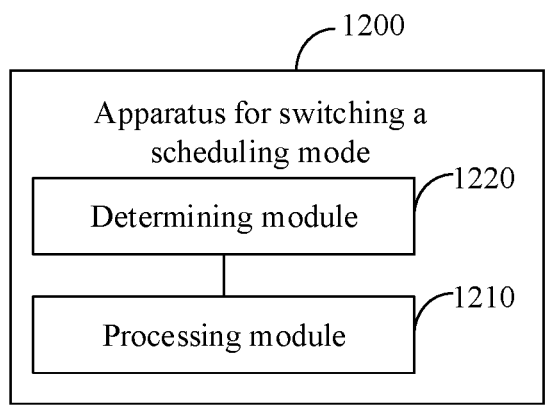
FIG. 12 is a schematic structural diagram of an apparatus for switching a scheduling mode according to an embodiment of the present disclosure.

Corresponding to the method for switching the scheduling mode provided by the above-mentioned embodiments, the present disclosure further provides an apparatus for switching the scheduling mode. Since the apparatuses for switching the scheduling mode provided by embodiments of the present disclosure correspond to the methods for switching the scheduling mode provided by the above-mentioned embodiments, implementations of the methods for switching the scheduling mode are also applicable to the apparatuses for switching the scheduling mode provided by the embodiments, and will not be described in detail in the present disclosure. FIGS. 11-12 are schematic structural diagrams of apparatuses for switching a scheduling mode according to an embodiment of the present disclosure. The apparatus can be applied to a terminal.

As shown in FIG. 11, an apparatus 1200 for switching a scheduling mode includes:
  a processing module 1210, configured to switch a scheduling mode based on acquired first DCI, where the first DCI includes an indication of a target scheduling mode adopted by a terminal.

In the present disclosure, the scheduling mode can refer to whether a downlink control channel and a data channel are on a same carrier or on different carriers. Scheduling modes can include self-scheduling and cross-carrier scheduling. Self-scheduling may mean that the downlink control channel and data channel are on the same carrier, and cross-carrier scheduling may mean that the downlink control channel and data channel are on different carriers.

In some examples, the processing module 1210 is configured to:
  in response to the target scheduling mode indicated in the acquired first DCI being different from a current scheduling mode, switch the scheduling mode to the target scheduling mode;
  or,
  in response to the target scheduling mode indicated in the acquired first DCI being the same as a current scheduling mode, maintain the current scheduling mode.

In some examples, the processing module 1210 is configured to:
  acquire the first DCI based on a target RNTI corresponding to the terminal; and
  determine the target scheduling mode of the terminal according to a current value of a target bit corresponding to the terminal in the first DCI.

In some examples, as shown in FIG. 12, the apparatus further includes:

a determining module 1220, configured to determine the target RNTI corresponding to a group to which the terminal belongs based on an acquired terminal grouping indication message.

In some examples, the processing module 1210 is configured to:

in response to a value of a designated information field in acquired DCI being a first designated value, determine the acquired DCI as the first DCI;

determine a current value of a target bit corresponding to the terminal in the first DCI; and determine the target scheduling mode of the terminal according to the current value of the target bit.

In some examples, the processing module 1210 is configured to:

in response to a number of bits contained in acquired DCI being a second designated value, determine the acquired DCI as the first DCI;

determine a current value of a target bit corresponding to the terminal in the first DCI; and determine the target scheduling mode of the terminal according to the current value of the target bit.

In some examples, the apparatus further includes: an acquisition module configured to:

acquire the first DCI in a CSS;

or, acquire the first DCI in a USS;

In some examples, a length of the first DCI is different from a length of any other existing DCI, or a length of the first DCI is the same as a length of fallback DCI.

In some examples, the first DCI includes a target scheduling method of at least one terminal.

In the apparatus for switching the scheduling mode in the embodiment of the present disclosure, the scheduling mode is switched according to the target scheduling mode indicated by DCI, so that fast switching between self-scheduling and cross-carrier scheduling is achieved, which can better adapt to changes in link quality and load, and improve utilization of system resources.

Figure 13:
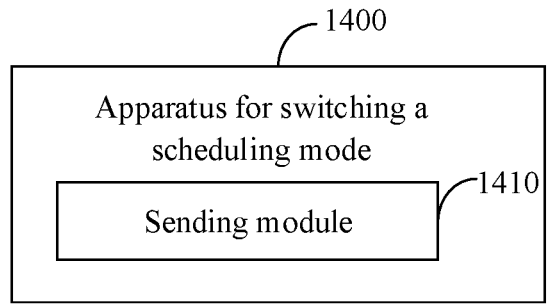
FIG. 13 is a schematic structural diagram of another apparatus for switching a scheduling mode according to an embodiment of the present disclosure.
Figure 14:
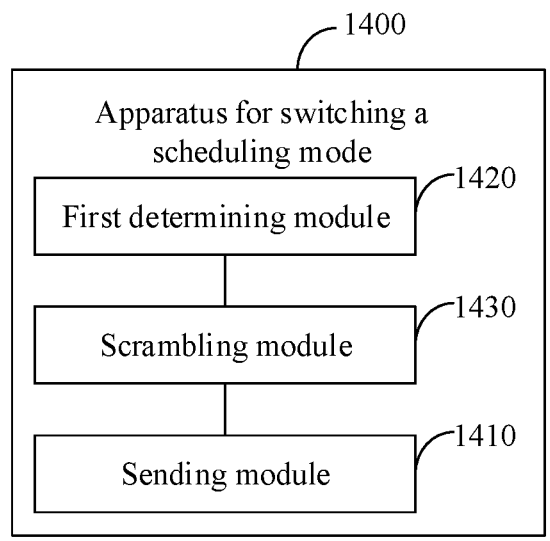
FIG. 14 is a schematic structural diagram of another apparatus for switching a scheduling mode according to an embodiment of the present disclosure.

Corresponding to the methods for switching the scheduling mode provided in the above embodiments, the present disclosure further provides apparatuses for switching the scheduling mode. Since the apparatuses for switching the scheduling mode provided by embodiments of the present disclosure correspond to the methods for switching the scheduling mode provided by the above-mentioned embodiments, implementations of the methods for switching the scheduling mode are also applicable to the apparatuses for switching the scheduling mode provided by the embodiments, and will not be described in detail in the present disclosure. FIGS. 13-14 are schematic structural diagrams of apparatuses for switching a scheduling mode according to an embodiment of the present disclosure. The apparatus can be applied to a base station.

As shown in FIG. 13, an apparatus 1400 for switching a scheduling mode includes:

a sending module 1410, configured to send first DCI, where the first DCI includes an indication of a target scheduling mode adopted by one or more terminals.

In some examples, the sending module 1410 is configured to:

send the first DCI in a CSS of a primary cell/primary secondary cell;

or, send the first DCI in a CSS of a secondary cell;

or, send the first DCI in a USS of a secondary cell.

In some examples, as shown in FIG. 14, the apparatus further includes:

a first determining module 1420, configured to in response to determining that a scheduling mode of any terminal is to be switched, determine that the first DCI is to be sent, set a current value of a target bit corresponding to the any terminal in the first DCI, where the any terminal is included in the one or more terminals; and a scrambling module 1430, configured to scramble a CRC code in the first DCI based on a target RNTI corresponding to the any terminal.

In some examples, one terminal corresponds to one RNTI, or a plurality of terminals correspond to one RNTI.

In some examples, the apparatus further includes:

a second determining, configured to in response to determining that a scheduling mode of any terminal is to be switched, determine that the first DCI is to be sent;

set a value of a designated information field in the first DCI to a first designated value, where the any terminal is included in the one or more terminals.

In some examples, the apparatus further includes:

a third determining, configured to in response to determining that a scheduling mode of any terminal is to be switched, determine that the first DCI is to be sent;

set a number of bits contained in the first DCI to a second designated value, where the any terminal is included in the one or more terminals.

In some examples, a length of the first DCI is different from a length of any other existing DCI, or a length of the first DCI is the same as a length of fallback DCI.

In some examples, the first DCI includes a target scheduling method of at least one terminal.

According to the apparatus for switching the scheduling mode in the embodiment of the present disclosure, a target scheduling mode of a terminal is indicated by DCI, so that the terminal can quickly switch between self-scheduling and cross-carrier scheduling, which can better adapt to changes in link quality and load, and improve utilization of system resources.

According to an embodiment of the present disclosure, the present disclosure further provides a communication device and a readable storage medium.

Figure 15:
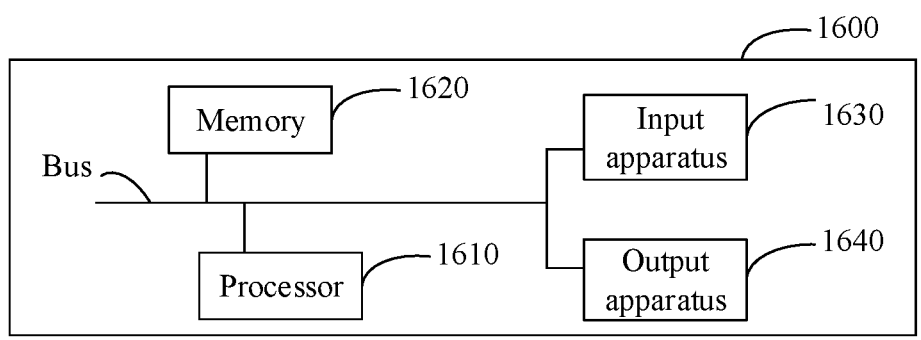
FIG. 15 is a block diagram of an electronic device configured to realize a method for switching a scheduling mode of an embodiment of the present disclosure.

FIG. 15 shows a schematic block diagram of an example communication device 1600 that can be used to implement embodiments of the present disclosure. A communication device is intended to represent various forms of digital computers, such as a laptop computer, a desktop computer, a workstation, a personal digital assistant, a server, a blade server, a mainframe computer, and other suitable computers. The communication device may further represent various forms of mobile apparatuses, such as a personal digital processing, a cellular phone, a smart phones, a wearable device and other similar computing apparatuses. The components shown herein, their connections and relationships, and their functions are only examples, and are not intended to limit the implementation of the present disclosure described and/or required herein.

As shown in FIG. 15, the communication device includes: one or more processors 1610, a memory 1620, and interfaces for connecting various components, including a high-speed interface and a low-speed interface. Each component is interconnected by different buses, and can be installed on a common motherboard or in other ways as needed. A processor may process instructions executed within a communication device, including instructions stored in or on a memory to display graphical information of a GUI on an external input/output apparatus (such as a display device coupled to an interface). In other embodiments, a plurality of processors and/or a plurality of buses may be used with a plurality of memories and a plurality of memories, if necessary. Similarly, a plurality of communication devices can be connected, and each device provides some necessary operations (for example, as a server array, a group of blade servers, or a multiprocessor system). A processor 1610 is taken as an example in FIG. 15.

A memory 1620 is a non-transitory computer-readable storage medium provided by the present disclosure. The memory stores instructions executable by at least one processor to make the at least one processor execute the method for switching the scheduling mode provided by the present disclosure. The non-transitory computer-readable storage medium of the present disclosure stores computer instructions for causing a computer to execute the method for switching the scheduling mode provided by the present disclosure.

As a non-transitory computer-readable storage medium, the memory 1620 can be used to store non-transitory software programs, non-transitory computer-executable programs and modules, such as program instructions/modules corresponding to the method for switching the scheduling mode in the embodiment of the present disclosure (for example, the processing module 1210 shown in FIG. 11 or the sending module 1410 shown in FIG. 13). The processor 1610 executes various functional applications and data processing of a server by running non-transitory software programs, instructions and modules stored in the memory 1620, i.e., implementing the method for switching the scheduling mode in the method embodiments described above.

The memory 1620 may include a storage program area and a storage data area, where the storage program area may store an operating system and an application program required by at least one function. The storage data area may store data created according to the use of a positioning communication device and the like. In addition, the memory 1620 may include a high-speed random access memory and may further include a non-transitory memory, for example, at least one disk memory device, flash memory device, or other non-transitory solid-state memory devices. In some examples, the memory 1620 may include memories remotely located relative to the processor 1610, and these remote memories may be connected to the positioning communication device through a network. Examples of the above networks include, but are not limited to, an Internet, an intranet, a local area network, a mobile communication network, and combinations thereof.

The communication device for switching the scheduling mode may further include an input apparatus 1630 and an output apparatus 1640. The processor 1610, the memory 1620, the input apparatus 1630, and the output apparatus 1640 may be connected by a bus or other means, with the connection via a bus being used as an example in FIG. 15.

The input apparatus 1630 can receive input digital or character information and generate key signal input related to user setting and function control of positioning communication device, such as a touch screen, a keypad, a mouse, a track pad, a touch pad, a pointing stick, one or more mouse buttons, a trackball, a joystick and other input apparatuses. The output apparatus 1640 may include a display device, an auxiliary lighting apparatus (for example, an LED), a tactile feedback apparatus (for example, a vibration motor), and the like. The display device may include, but is not limited to, a liquid crystal display (LCD), a light emitting diode (LED) display and a plasma display. In some embodiments, the display device may be a touch screen.

Various embodiments of the systems and techniques described herein may be implemented in a digital electronic circuit system, an integrated circuit system, a specialized ASIC (application specific integrated circuit), a computer hardware, a firmware, a software, and/or combinations thereof. These various implementation may include: implementing in one or more computer programs that can be executed and/or interpreted on a programmable system including at least one programmable processor, which may be a special-purpose or general-purpose programmable processor and can receive data and instructions from a storage system, at least one input apparatus, and at least one output apparatus, and transmit data and instructions to the storage system, the at least one input apparatus, and the at least one output apparatus.

These computing programs (also called programs, software, software applications, or codes) include machine instructions of a programmable processor, and these computing programs can be implemented using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to the programmable processor, including machine-readable media that receive machine instructions as machine-readable signals. The term "machine-readable signal" refers to any signal used to provide machine instructions and/or data to the programmable processor.

In order to provide interaction with users, systems and techniques described herein can be implemented on a computer having: a display apparatus (for example, a CRT (cathode ray tube) or an LCD (liquid crystal display) monitor) for displaying information to users; and a keyboard and a pointing apparatus (for example, a mouse or a trackball) through which a user can provide input to the computer. Other kinds of apparatuses can also be used to provide interaction with users. For example, a feedback provided to the user can be any form of sensory feedback (for example, visual feedback, auditory feedback, or tactile feedback); and an input from the user can be received in any form (including acoustic input, voice input or tactile input).

The systems and techniques described herein may be implemented in a computing system that includes a backend component (e.g., as a data server), or a computing system that includes a middleware component (e.g., an application server), or a computing system that includes a frontend component (e.g., a user computer having a graphical user interface or a web browser through which a user may interact with implementations of the systems and techniques described herein), or any combination of such backend component, middleware component, or frontend component. Components of the system can be interconnected by any form or medium of digital data communication (for example, a communication network). Examples of the communication network include: a local area network (LAN), a wide area network (WAN) and an Internet.

A computer system may include a client and a server. The client and server are generally far away from each other and usually interact through a communication network. A relationship between client and server is generated by computer programs that run on a corresponding computer and have a client-server relationship with each other.

In the apparatus for switching the scheduling mode provided by the embodiment of the present disclosure, a base station uses DCI to indicate a target scheduling mode of a terminal, and the terminal switches a scheduling mode according to the target scheduling mode indicated by DCI, so that fast switching between self-scheduling and cross-carrier scheduling is achieved, which can better adapt to changes in link quality and load, and improve utilization of system resources.

It should be understood that steps can be reordered, added or deleted using the various forms of flow shown above. For example, the steps described in the present application can be executed in parallel, in sequence, or in different orders. As long as the desired results of the technical solution disclosed in the present disclosure can be achieved, there is no restriction here.

The above specific embodiments do not limit the protection scope of the present disclosure. Those skilled in the art should understand that various modifications, combinations, sub-combinations and substitutions can be made to the method steps, apparatuses or device units in the method, apparatus and device embodiments of the present disclosure according to design requirements and other factors. Any modification, equivalent substitution and improvement made within the spirit and principles of the present disclosure should be included in the protection scope of the present disclosure.

The invention claimed is:

1. A method of switching a scheduling mode, applied to a terminal, comprising:
switching a scheduling mode based on acquired first downlink control information (DCI), wherein the first DCI comprises an indication of a target scheduling mode adopted by a terminal.

2. The method according to claim 1, wherein the switching the scheduling mode based on the acquired first DCI comprises:
in response to the target scheduling mode indicated in the acquired first DCI being different from a current scheduling mode, switching the scheduling mode to the target scheduling mode; or,
in response to the target scheduling mode indicated in the acquired first DCI being the same as a current scheduling mode, maintaining the current scheduling mode.

3. The method according to claim 2, wherein the switching the scheduling mode based on the acquired first DCI comprises:
acquiring the first DCI based on a target radio network temporary identifier (RNTI) corresponding to the terminal; and
determining the target scheduling mode of the terminal according to a current value of a target bit corresponding to the terminal in the first DCI.

4. The method according to claim 3, further comprising:
determining the target RNTI corresponding to a group to which the terminal belongs based on an acquired terminal grouping indication message.

5. The method according to claim 2, wherein the switching the scheduling mode based on the acquired first DCI comprises:
in response to a value of a designated information field in acquired DCI being a first designated value, determining the acquired DCI as the first DCI;
determining a current value of a target bit corresponding to the terminal in the first DCI; and
determining the target scheduling mode of the terminal according to the current value of the target bit.

6. The method according to claim 2, wherein the switching the scheduling mode based on the acquired first DCI comprises:
in response to a number of bits contained in acquired DCI being a second designated value, determining the acquired DCI as the first DCI;
determining a current value of a target bit corresponding to the terminal in the first DCI; and
determining the target scheduling mode of the terminal according to the current value of the target bit.

7. The method according to claim 1, further comprising:
acquiring the first DCI in a common search space (CSS); or,
acquiring the first DCI in a UE-specific search space (USS).

8. The method according to claim 1, wherein a length of the first DCI is different from a length of any other existing DCI, or a length of the first DCI is the same as a length of fallback DCI.

9. The method according to claim 1, wherein the first DCI comprises a target scheduling mode of at least one terminal.

10. A method of switching a scheduling mode, applied to a base station, comprising:
sending first downlink control information (DCI), wherein the first DCI comprises an indication of a target scheduling mode adopted by one or more terminals.

11. The method according to claim 10, wherein the sending the first DCI comprises:
sending the first DCI in a common search space (CSS) of a primary cell/primary secondary cell; or,
sending the first DCI in a CSS of a secondary cell; or,
sending the first DCI in a UE-specific search space (USS) of a secondary cell.

12. The method according to claim 10, further comprising:
in response to determining that a scheduling mode of any terminal is to be switched, determining that the first DCI is to be sent,
setting a current value of a target bit corresponding to the any terminal in the first DCI, wherein the any terminal is comprised in the one or more terminals; and
scrambling a cyclic redundancy check (CRC) code in the first DCI based on a target radio network temporary identifier (RNTI) corresponding to the any terminal.

13. The method according to claim 12, wherein one terminal corresponds to one RNTI, or a plurality of terminals correspond to one RNTI.

14. The method according to claim 10, further comprising:
in response to determining that a scheduling mode of any terminal is to be switched, determining that the first DCI is to be sent;
setting a value of a designated information field in the first DCI to a first designated value, wherein the any terminal is comprised in the one or more terminals.

15. The method according to claim 10, further comprising:
in response to determining that a scheduling mode of any terminal is to be switched, determining that the first DCI is to be sent,
setting a number of bits contained in the first DCI to a second designated value, wherein the any terminal is comprised in the one or more terminals.

16. The method according to claim 10, wherein, a length of the first DCI is different from a length of any other existing DCI, or a length of the first DCI is the same as a length of fallback DCI.

17. A communication device, comprising: a transceiver, a memory, and a processor connected to the transceiver and the memory, respectively, configured to control radio signal transmission and reception of the transceiver by executing computer-executable instructions on the memory, and configured to:
switch a scheduling mode based on acquired first downlink control information (DCI), wherein the first DCI comprises an indication of a target scheduling mode adopted by a terminal.

18. A non-transitory computer storage medium, wherein the computer storage medium stores computer executable instructions; when the computer executable instructions are executed by a processor, the method according to claim 1 is implemented.

19. A communication device, comprising: a transceiver, a memory, and a processor connected to the transceiver and the memory, respectively, and configured to control radio signal transmission and reception of the transceiver by executing computer-executable instructions on the memory, and implement the method according to claim 10.

20. A non-transitory computer storage medium, wherein the computer storage medium stores computer executable instructions; when the computer executable instructions are executed by a processor, the method according to claim 10 is implemented.

* * * * *